US009210950B2

(12) United States Patent
DesJardin et al.

(10) Patent No.: US 9,210,950 B2
(45) Date of Patent: Dec. 15, 2015

(54) PERSONAL JUICE EXTRACTOR SYSTEM

(71) Applicants: Nathan Mark DesJardin, Columbia, MD (US); Matthew C. DesJardin, Union, KY (US); Timothy J. DesJardin, Burlington, KY (US)

(72) Inventors: Nathan Mark DesJardin, Columbia, MD (US); Matthew C. DesJardin, Union, KY (US); Timothy J. DesJardin, Burlington, KY (US)

(73) Assignee: DesJardin, LLC, Union, KY (US)

( * ) Notice: Subject to any disclaimer, the term of this patent is extended or adjusted under 35 U.S.C. 154(b) by 0 days.

(21) Appl. No.: 14/255,875

(22) Filed: Apr. 17, 2014

(65) Prior Publication Data
US 2015/0296860 A1  Oct. 22, 2015

(51) Int. Cl.
| | |
|---|---|
| *A47J 31/44* | (2006.01) |
| *A47J 31/40* | (2006.01) |
| *B02C 15/00* | (2006.01) |
| *B04B 5/10* | (2006.01) |
| *A23N 1/02* | (2006.01) |
| *A23L 2/04* | (2006.01) |
| *A47J 31/20* | (2006.01) |
| *A23N 1/00* | (2006.01) |
| *A47J 31/00* | (2006.01) |

(52) U.S. Cl.
CPC ... *A23N 1/02* (2013.01); *A23L 2/04* (2013.01); *A23N 1/00* (2013.01); *A47J 31/005* (2013.01); *A47J 31/20* (2013.01)

(58) Field of Classification Search
CPC ....... A47J 31/005; A47J 31/20; A47J 31/057; A47J 43/24; A47J 19/02; A47J 19/027; A21B 7/005; A01J 25/06; A23N 1/003; A23N 1/00; A23L 2/04; A22C 7/00; A23C 13/12

USPC .................. 99/279, 287, 304, 348, 456, 495, 99/501–503, 509–513; 426/489, 518, 519
See application file for complete search history.

(56) References Cited

U.S. PATENT DOCUMENTS

| | | | | |
|---|---|---|---|---|
| 3,185,071 | A * | 5/1965 | Foss | 100/353 |
| 4,345,517 | A * | 8/1982 | Arao et al. | 99/511 |
| 4,895,194 | A | 1/1990 | McCann et al. | |
| 5,348,393 | A | 9/1994 | Pappas, Jr. | |
| 6,135,019 | A * | 10/2000 | Chou | 99/513 |
| 6,223,652 | B1 | 5/2001 | Calia | |
| 6,616,323 | B2 | 9/2003 | McGill | |
| 6,786,440 | B2 | 9/2004 | Ling | |
| 6,817,750 | B1 | 11/2004 | Sands | |
| 7,063,456 | B2 | 6/2006 | Miller | |
| 7,066,640 | B2 | 6/2006 | Sands | |
| 7,267,478 | B2 | 9/2007 | Miller | |
| 7,430,957 | B2 | 10/2008 | Sands | |
| 2004/0020369 | A1* | 2/2004 | Long et al. | 99/307 |
| 2009/0272280 | A1* | 11/2009 | Cheung et al. | 99/513 |
| 2011/0041701 | A1* | 2/2011 | Chatterjee et al. | 99/295 |
| 2013/0344220 | A1* | 12/2013 | Farrell et al. | 426/590 |
| 2013/0344221 | A1* | 12/2013 | Farrell et al. | 426/590 |

* cited by examiner

*Primary Examiner* — Dana Ross
*Assistant Examiner* — Hemant Mathew
(74) *Attorney, Agent, or Firm* — Myers Wolin, LLC

(57) ABSTRACT

The invention concerns a personal juice extractor system including a blending and pressing apparatus where a user places a container charged with food or beverage or any combination thereof in a container chamber. After the start button is pressed, a blending tool attached to a shaft along with a cover are lowered into the container until the cover seals the open top of the container. The blending tool is axially rotated until a desired consistency is achieved. The cover then presses down on the blended contents, forcing liquid to flow out an outlet in the bottom of the container and into an external cup for consumption. The cover, shaft, and blending tool are retracted and then the container is removed from the container chamber and discarded or cleaned for reuse.

11 Claims, 17 Drawing Sheets

PERSONAL JUICE EXTRACTOR SYSTEM

FIELD OF THE INVENTION

The present invention relates to the field of domestic appliances, particularly the field of blenders, juice extractors or the like.

BACKGROUND OF THE INVENTION

Juice extractors have become increasingly popular over the years. These devices extract juice from fresh fruits and/or vegetables and provide people with fresh, healthy, and all natural beverages.

While numerous health benefits are associated with juicing, the extraction process is often known to be time-intensive, difficult, and messy. Typically, a user must: gather necessary fruit and/or vegetables, wash and cut the food to proper size, insert all food into the extractor, dispose of the organic waste, disassemble and clean the extractor parts, and lastly reassemble the extractor. Thus, many users are left frustrated and demanding a better option. Moreover, a correct portion size is not easily enforced due to no standard amount of fruit and/or vegetables allowed to be juiced during a single session. It is also known that devices have been made that simply blend fruit and/or vegetables into a pulp and provide both the pulp and juice mixed together for consumption. However, many people prefer a pulp-free beverage.

In a fast-paced world, there is an increasing demand for healthy beverages that can be prepared easily, quickly, and most importantly with minimal cleanup. Furthermore, people would greatly benefit from a properly portioned, fresh beverage from the comfort of their own home. For the foregoing reasons, there is a need for a machine that can produce personal juice beverages from fresh fruit and/or vegetables.

BRIEF SUMMARY

The present invention is directed to a personal blender and juicer system that meets these needs.

Specifically, it is an aspect of the invention to provide a food blending and pressing apparatus. The food blending and pressing apparatus includes a housing that covers moving machinery used for blending and pressing food and/or beverage in a removable container located in a container chamber. The upper face of the bottom of the container chamber preferably includes an anti-rotational surface so that when the container with a preferably complimentary anti-rotational bottom surface is inserted into the container chamber, the container is secured. A start button is preferably pressed by a user to initiate the automatic blending and pressing process. A blending tool is rotated by a driving source which blends food and/or beverage in the container to a desired consistency while a cover hermetically seals the container during the blending process. A primary elevator assembly is used to raise and lower a shaft attached to the blending tool during the blending process. The primary elevator is preferably driven by a spring-loaded lever. A secondary elevator assembly is used to raise and lower the cover during the blending and pressing. The secondary elevator is preferably driven by an inflatable and deflatable airbag. Once the blending process is complete, the cover is used to press the food and/or beverage towards the bottom of the container causing liquid to flow through an outlet in the container. The shaft is preferably connected to the driving source as well as to the secondary elevator by quick release connectors for quick removal and cleaning. The cover is preferably connected to the secondary elevator by a quick release connector for quick removal and cleaning.

Furthermore, it is another aspect of the invention to provide a container. The preferably cylindrical container has an upper opening to afford food and/or beverage, a blending tool and a cover. The top diameter of the container is preferably larger than that of the bottom diameter to allow for efficient stacking and a funnel is preferably connected to the top of the container to allow the cover to properly seal upon entering the upper opening of the container. The sides of the container preferably have vertical concave grooves extending half-way down to allow pressure to escape when the cover is inserted into the container. A spacer may be mounted at the center of the upper face of the bottom of the container to prevent the blending tool from contacting the bottom of the container during operation. The container preferably includes an anti-rotational surface on the bottom so that when inserted into a food blending and pressing apparatus with a complementary anti-rotational surface, the container is properly secured. The container is removably inserted into a food blending and pressing apparatus. Food and/or beverage is first blended and then pressed in the container, forcing liquid to flow through an outlet fitted with a filter in the bottom of the container into an external cup. The outlet is preferably connected to a secondary outlet extending out to a spout, thereby allowing liquid to be received in the external cup placed adjacent to the container. The outlet is preferably covered by a valve that prevents liquid from passing out of the container due to gravity. Furthermore the outlet and open top are preferably covered with a plastic film to prevent contamination prior to use.

It is another aspect of the invention to provide a method of blending and pressing food and/or beverage in a container wherein food and/or beverage is placed on a container, the container is secured in a container chamber, a shaft with a blending tool is lowered into the container while a cover is also lowered into the container to seal the container, the shaft and the blending tool are rotated by a driving source thereby blending the food and/or beverage, the shaft and the blending tool are moved up and down as necessary until a desire consistency is met, the cover is lowered further into the container thereby forcing liquid through an outlet in the container and into an external cup, followed by the cover, shaft, and blending tool being retracted, and then removing the container from the chamber. The cover and blending tool may be removed for cleaning.

These and other features, aspects, and advantages of the present invention will become better understood with reference to the following description and claims.

BRIEF DESCRIPTION OF THE DRAWINGS

The invention is generally shown by way of reference to the accompanying drawings in which.

DETAILED DESCRIPTION

Figure 1:
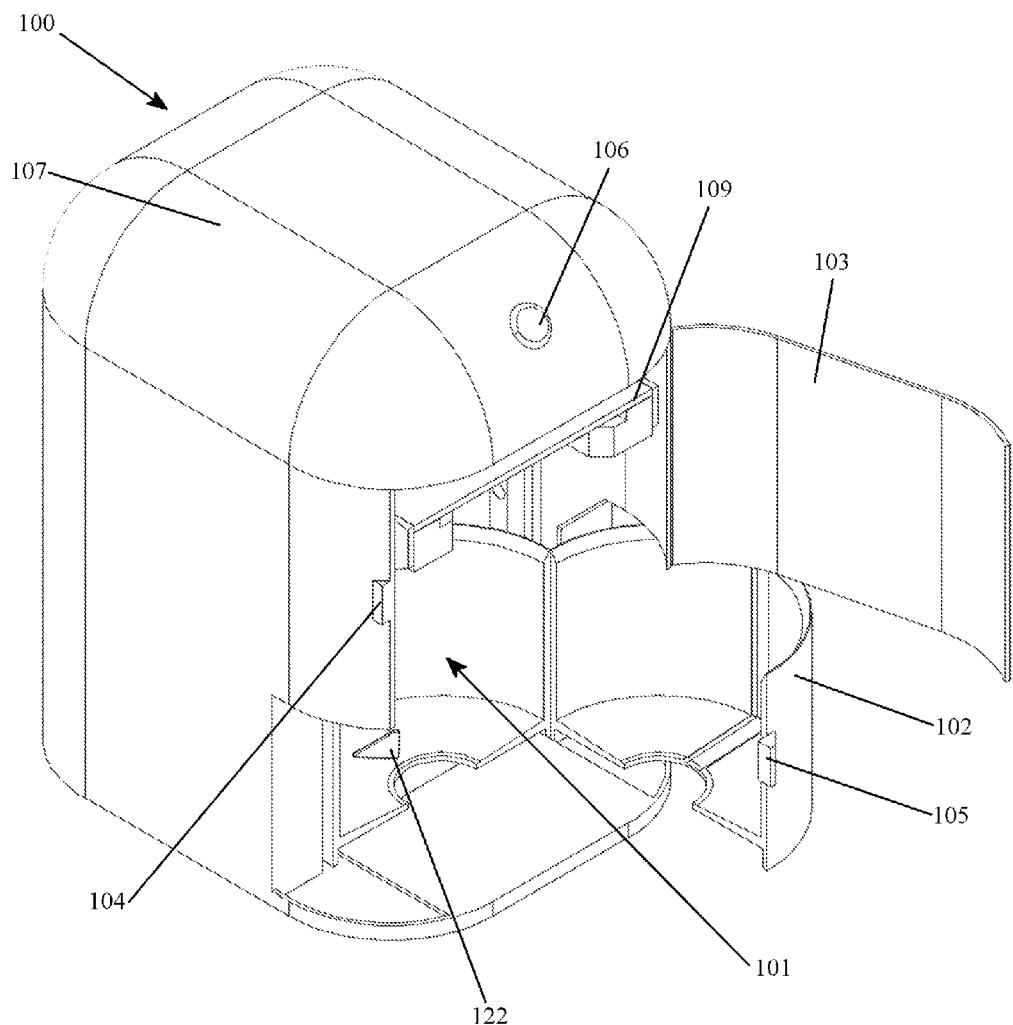
FIG. 1 is a perspective view of one embodiment of a food blending and pressing apparatus with both primary and secondary doors open, the container chamber empty, and the blending tool and cover removed.

Referring to the drawings, FIGS. 1-4 generally depict a food blending and pressing apparatus 100 comprising a removable container 200 with an open top 201 received in a container chamber 101, a cover 111 used for both sealing open top 201 and pressing the contents in container 200, and a blending tool 112 used for chopping, mixing, or liquefying food in container 200.

Figure 7:
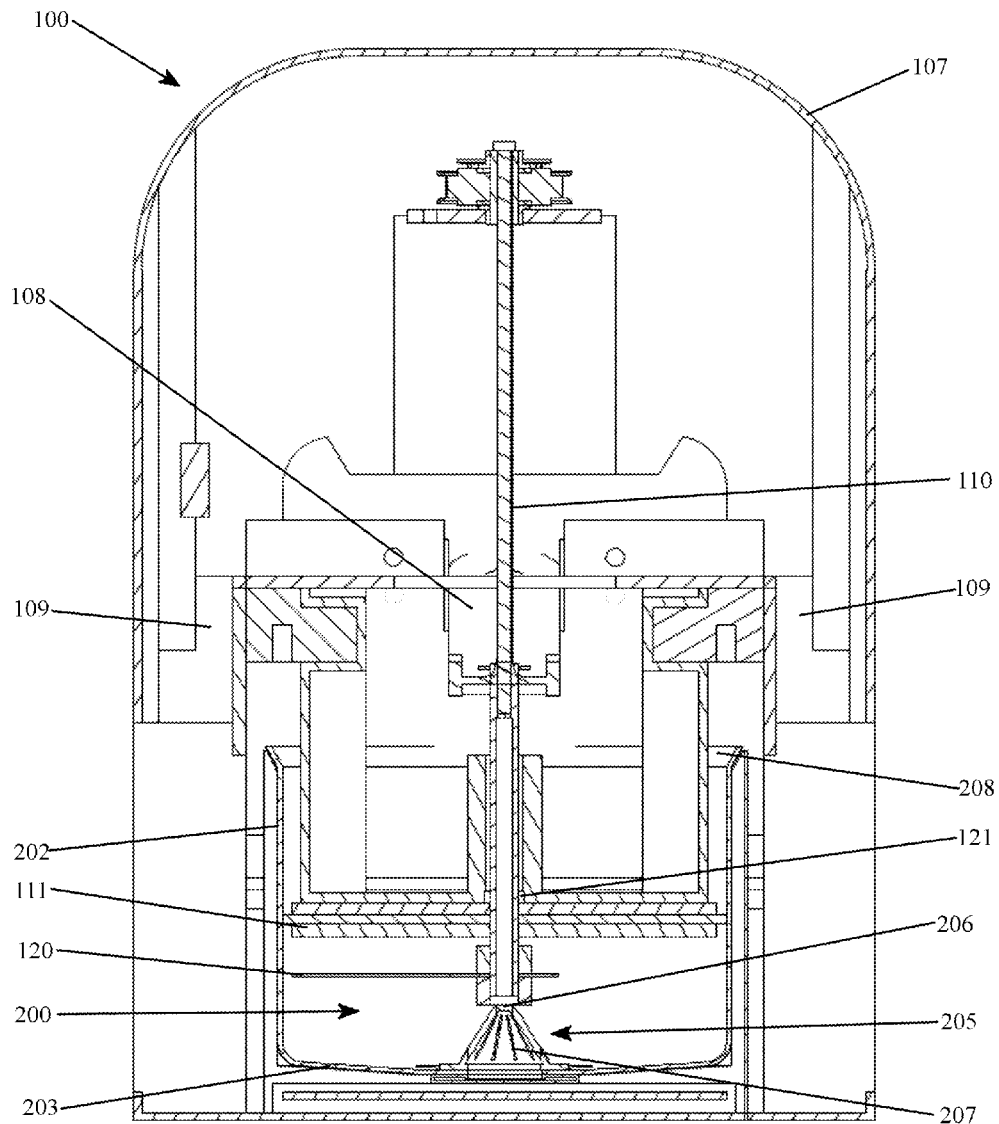
FIG. 7 is a frontal cross sectional view similar to FIG. 6 showing the blending tool and cover extended downward wherein the blending tool contacts the spacer.
Figure 11:
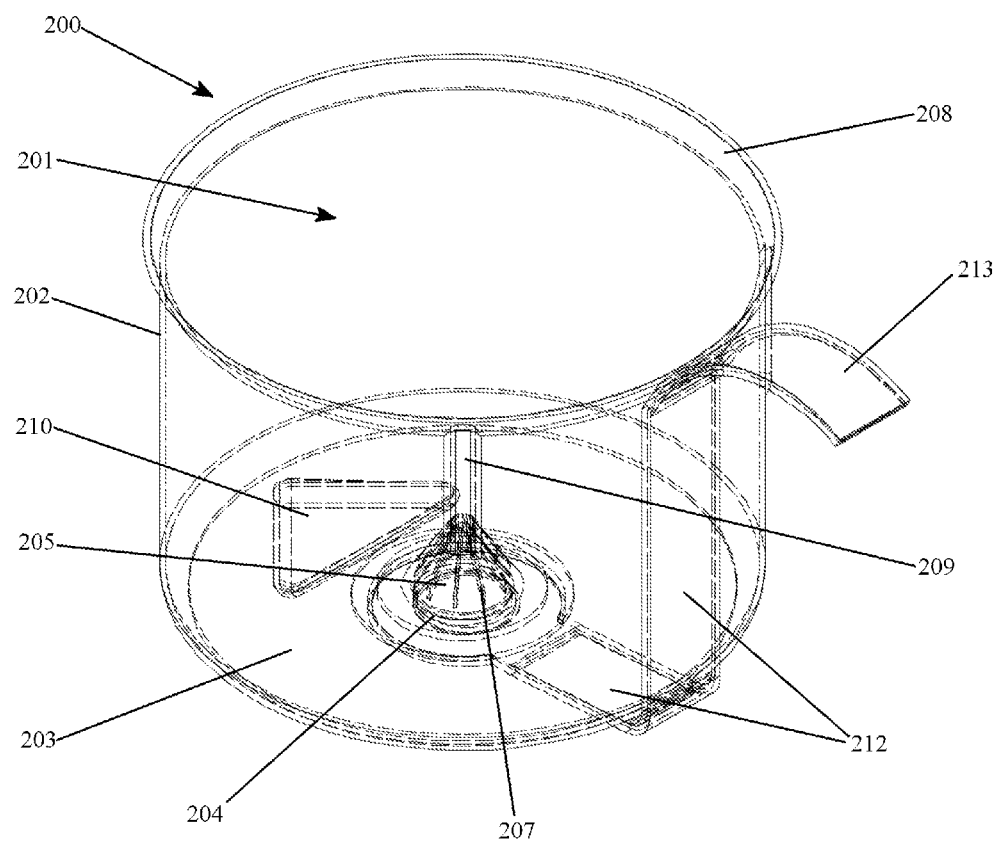
FIG. 11 is a perspective view of one embodiment of a container in accordance with the present invention.

FIG. 11 provides a view of one embodiment of container 200. Container 200 further comprises sides 202 which may be generally cylindrical and a bottom 203. For example, container 200 is constructed to hold food and/or beverage before, during, and after the blending and pressing process. An outlet 204 is mounted through bottom 203 to allow liquid to flow out of container 200 when pressurized. Outlet 204 has a filter 207 which provides a sieve-like configuration to prevent solids from flowing out of container 200 during the blending and pressing process. A spacer 205 may be mounted on the upper surface of bottom 203. As shown in FIG. 7, spacer 205 prevents blending tool 112 from hitting and thus damaging bottom 203 during operation. The upper face of spacer 205 is a bearing surface 206 and therefore allows blending tool 112 to spin freely while contacting bearing surface 206.

In one example of container 200, all parts of container 200 are manufactured with non-hazardous materials conforming to international food safety standards. The materials used to construct it may be such that container 200 is discarded after a single use. Likewise, in another example, the materials used to construct container 200 may be such that it is reusable after cleaning by increasing the thickness and strength of such materials.

Figure 10:
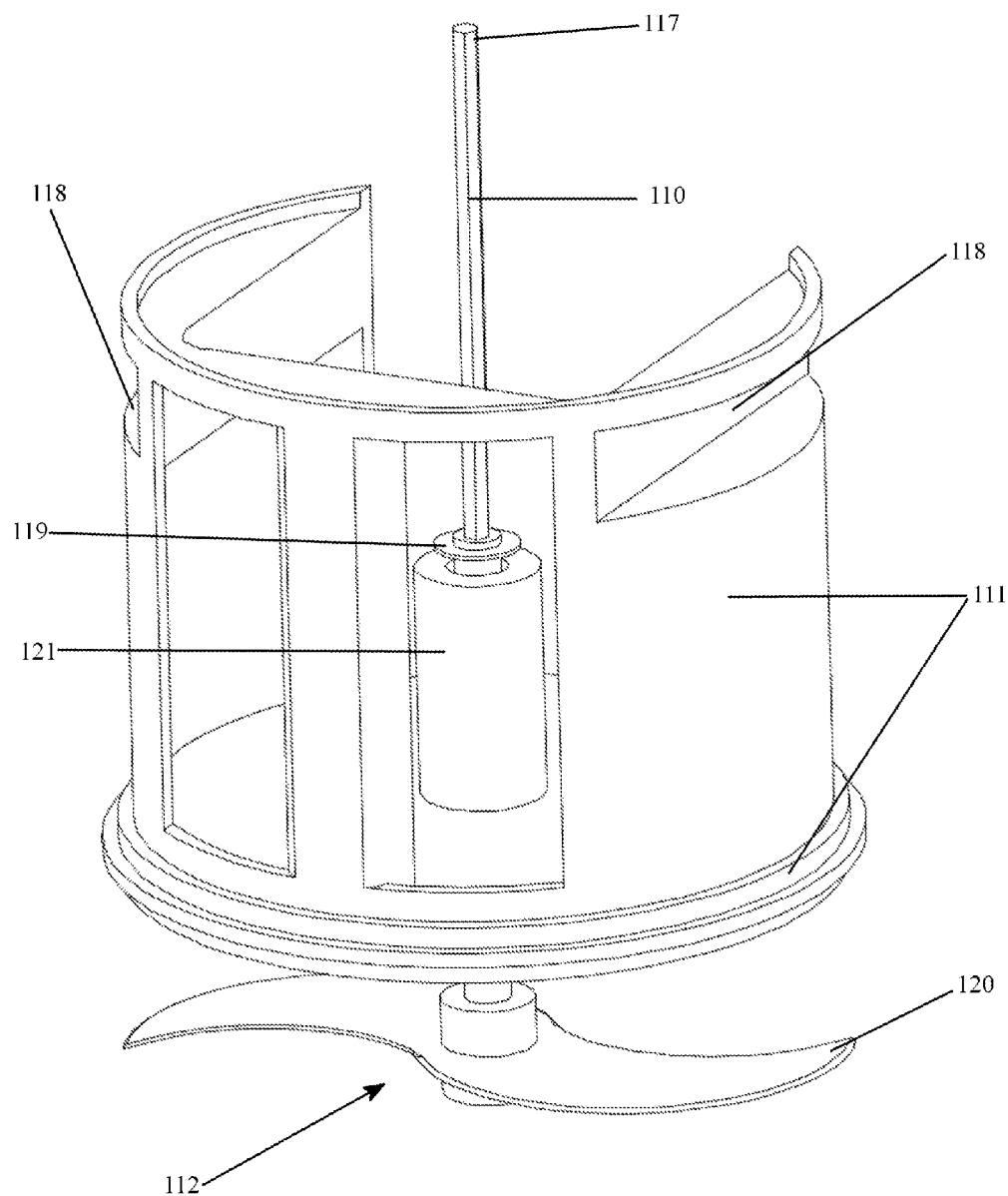
FIG. 10 is a perspective view of the blending tool and cover assembly of the blending and pressing apparatus shown in FIG. 2.

FIG. 10 illustrates one embodiment of cover 111. Cover 111 is used to hermetically seal open top 201 of container 200 and also to press food and/or beverage toward bottom 203 forcing liquid to flow out through outlet 204. For example, a secondary elevator assembly 109 is attached to cover 111 (FIGS. 5-7) to provide the means to vertically reciprocate cover 111 up and down as needed during the blending and pressing process. The reciprocating motion of secondary elevator assembly 109 may be driven by deflating and inflating an airbag apparatus 116. A releasable connector 118 may be integrated into cover 111 to allow cover 111 to be removed for cleaning (FIG. 10).

Figure 5:
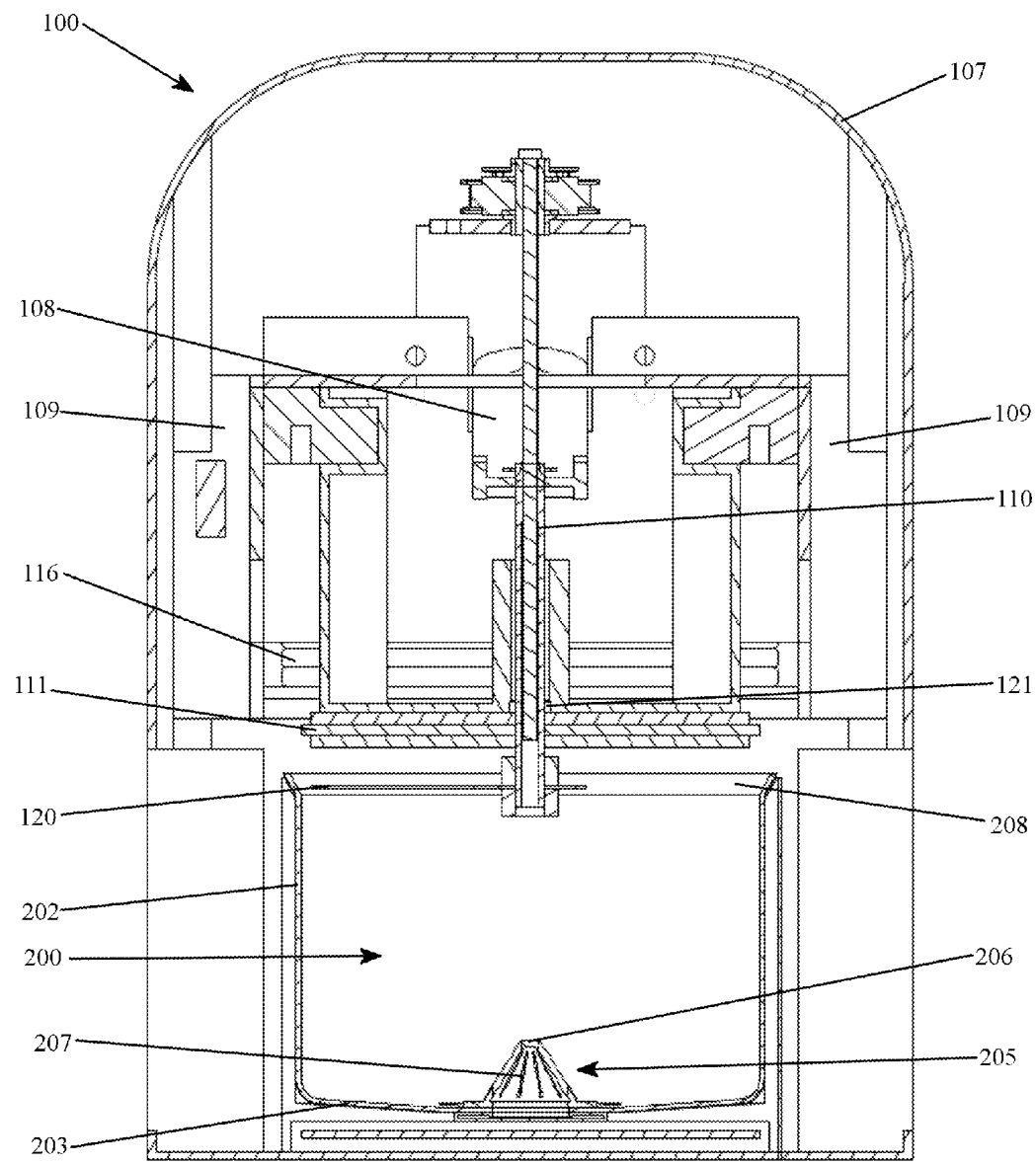
FIG. 5 is a frontal cross sectional view of the food blending and pressing apparatus of FIG. 3 showing the blending tool and cover fully refracted.
Figure 6:
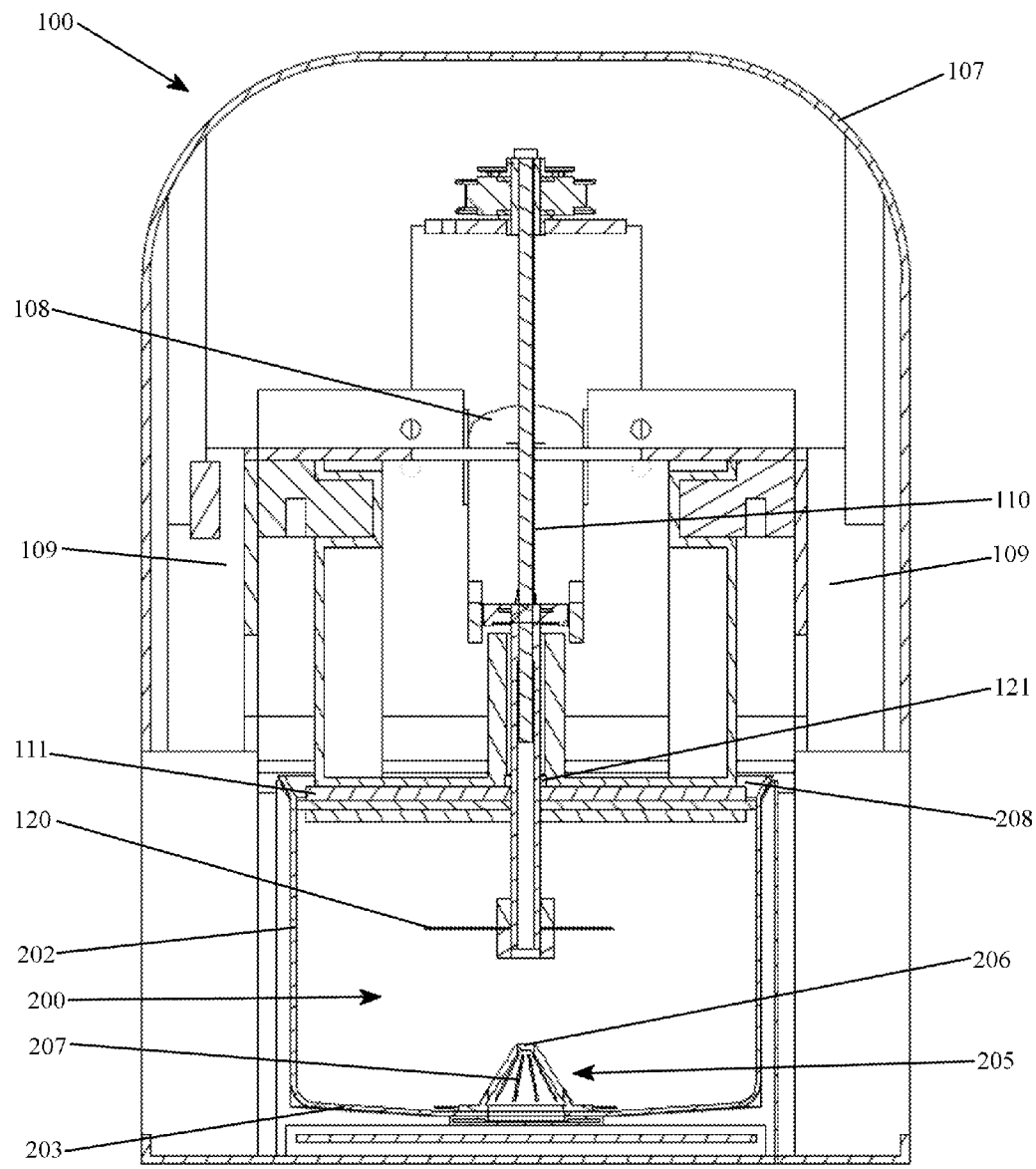
FIG. 6 is a frontal cross sectional view similar to FIG. 5 showing the blending tool and cover are partially extended downward wherein the cover contacts the container.
Figure 8:
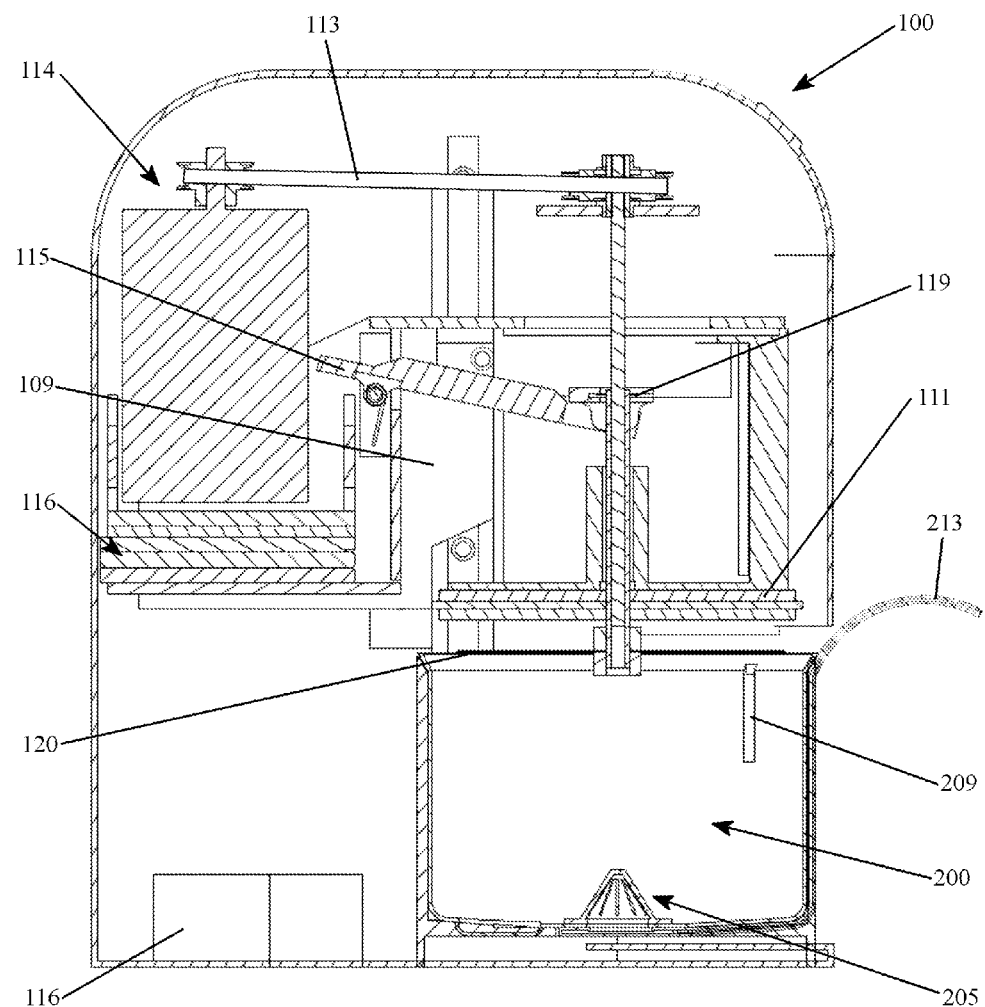
FIG. 8 is a side cross sectional view of the food blending and pressing apparatus of FIG. 5 showing the airbag apparatus deflated.
Figure 9:
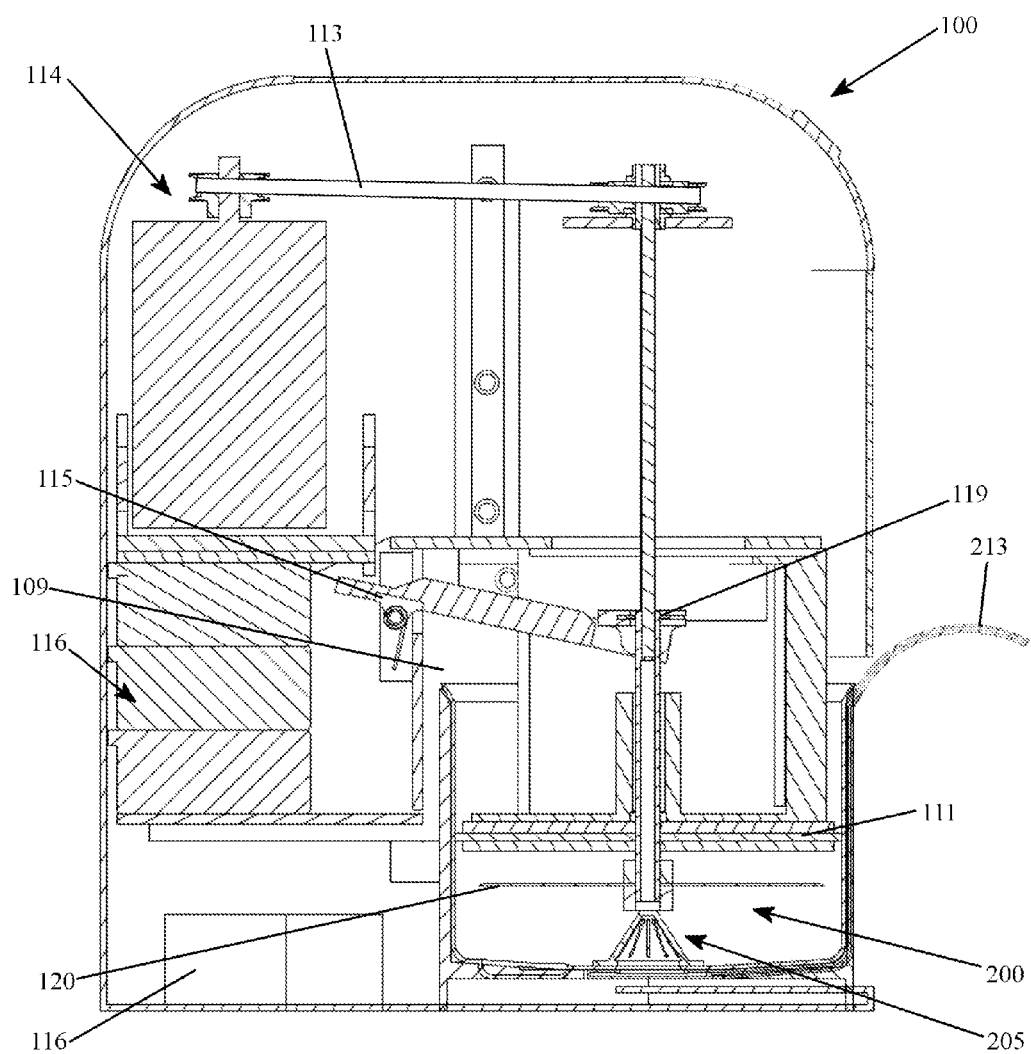
FIG. 9 is a side cross sectional view of the food blending and pressing apparatus of FIG. 7 showing the airbag inflated.

FIG. 10 also illustrates one embodiment of blending tool 112. Blending tool 112 is attached to the bottom end of a shaft 110. Shaft 110 is extended through the center of cover 111 and includes a connector 117 on the top end of shaft 110 that is connected to a driving source 114 using a belt 113 to rotate blending tool 112. In the preferred embodiment, connector 117 has a hex shaped cross-section and is integrated into shaft 110. A sanitary seal 121 is attached to cover 111, hermetically sealing cover 111 about shaft 110 thereby preventing air, liquid, or solids escaping from container 200 (FIG. 7). A primary elevator assembly 108 is attached to shaft 110 to provide the means to vertically reciprocate blending tool 112 up and down as needed during the blending and pressing process (FIGS. 5-7). The reciprocating motion of primary elevator assembly 108 may be driven by a spring-load lever 115 (FIGS. 8-9). Connectors 117 and 119 may be releasable to allow blending tool 112 and shaft 110 to be removed for cleaning. Blending tool 112 may include radially extended cutting blades 120 with sharpened edges, pointed tips, and one or more bends along the surface of the cutting elements.

Figure 2:
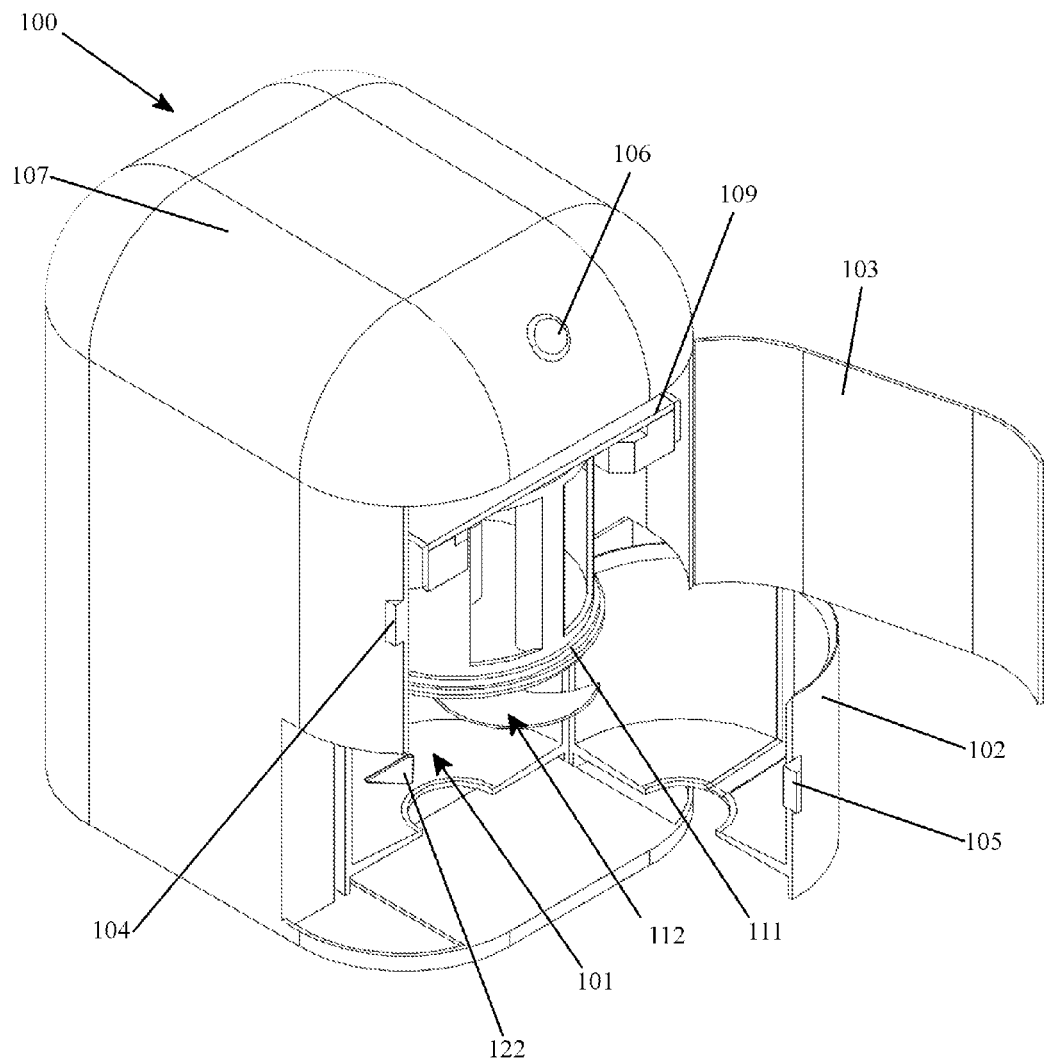
FIG. 2 is a perspective view similar to FIG. 1 with the blending tool and cover inserted.
Figure 3:
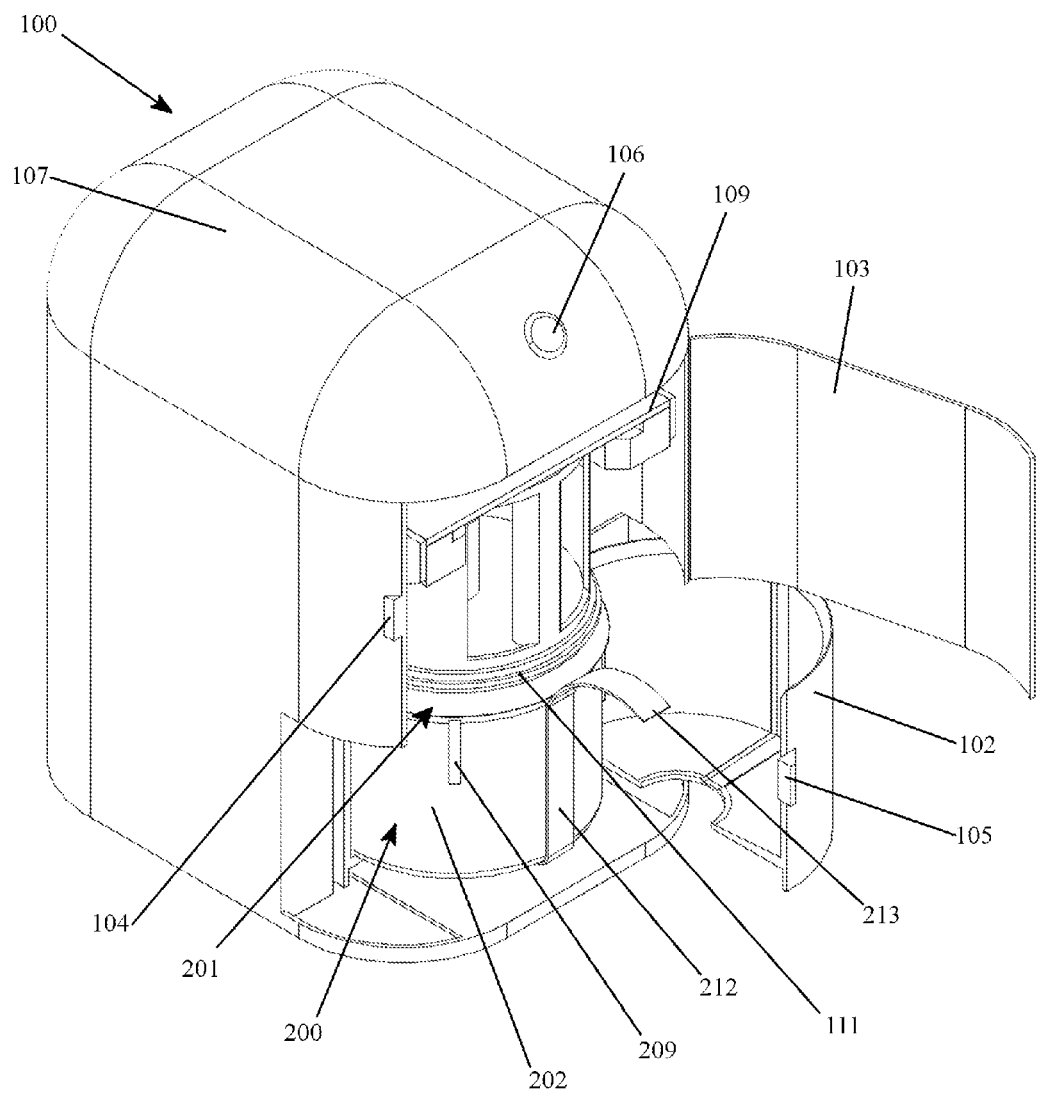
FIG. 3 is a perspective view similar to FIG. 2 with the container inserted in the container chamber.
Figure 4:
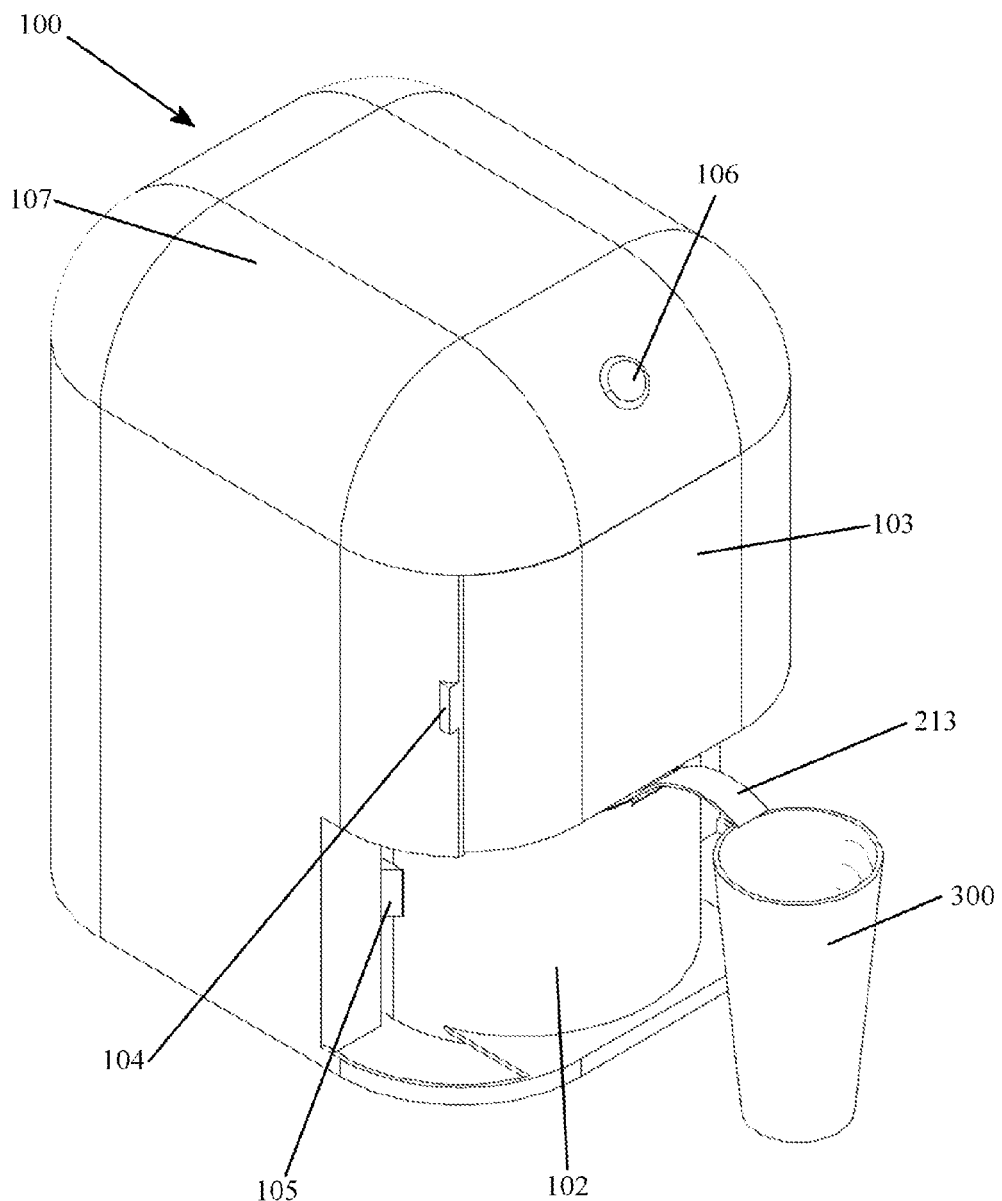
FIG. 4 is a perspective view similar to FIG. 3 with both primary and secondary doors closed and an external cup placed next to the food blending and pressing apparatus.
Figure 12A:
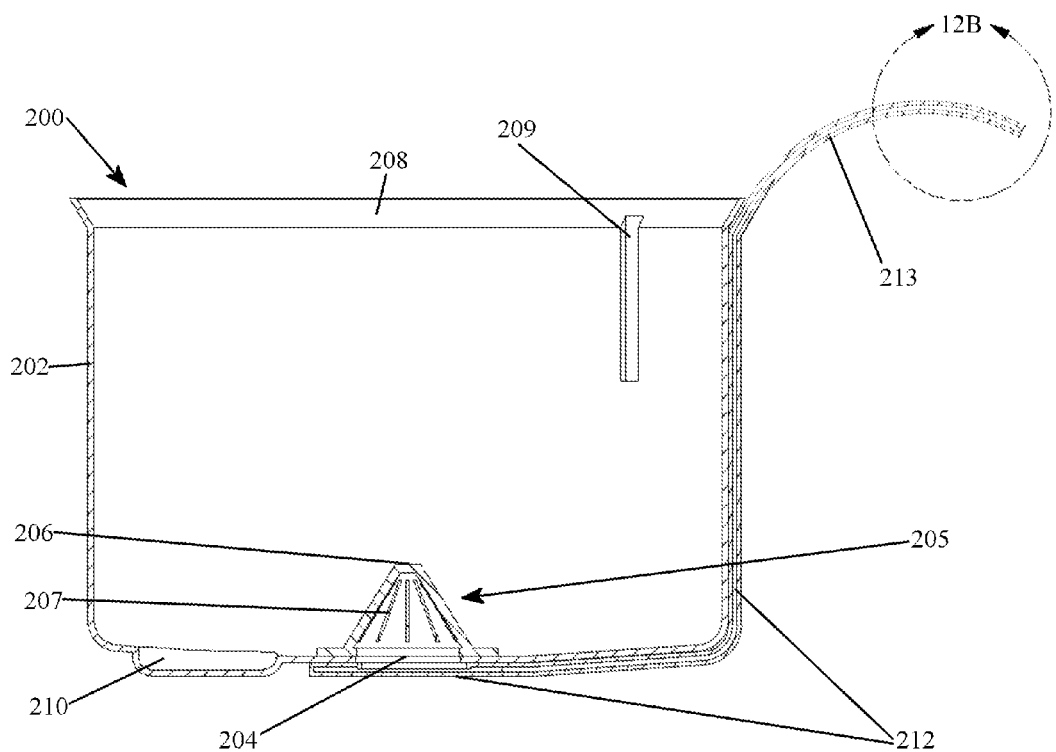
FIG. 12A is a side cross sectional view of the container shown in FIG. 11.
Figure 12B:
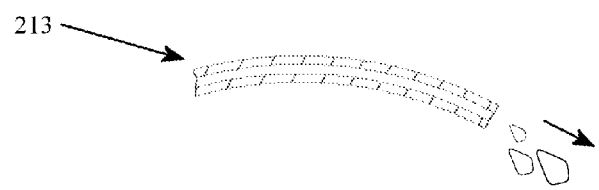
FIG. 12B is an enlarged side cross sectional view of the spout shown in FIG. 12A with liquid exiting the spout.
Figure 13:
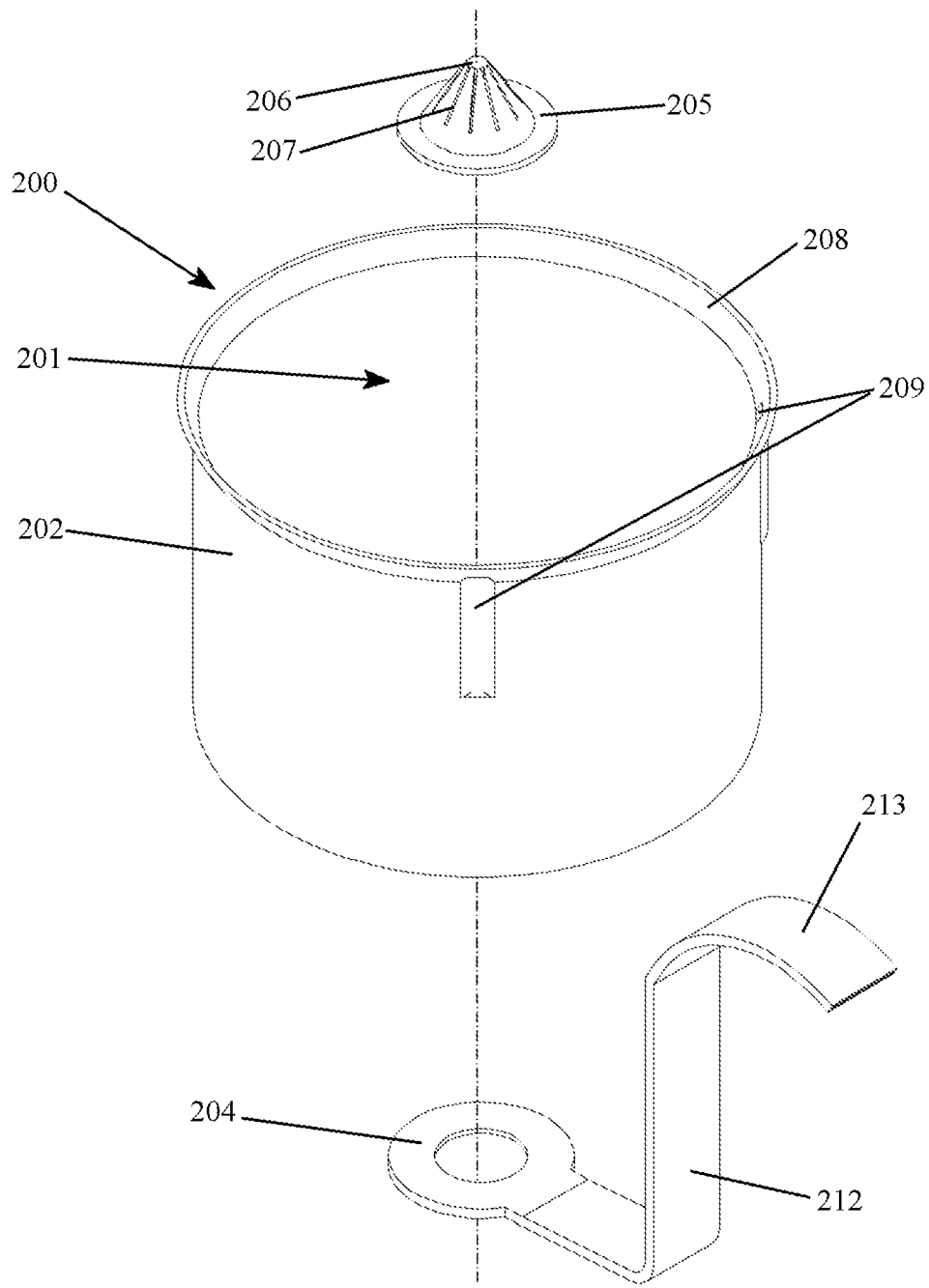
FIG. 13 is an exploded view of the container shown in FIG. 11.

FIGS. 1-4 generally illustrate the process of installing components into food blending and pressing apparatus 100. FIG. 1 shows a housing 107 used to protect the components. A primary door 103 and latch 104 may be opened to provide access to blending tool 112 and cover 111 (FIG. 2). A secondary door 102 and latch 105 may be opened to provide access to container chamber 101. Blending tool 112 and cover 111 are inserted into food blending and pressing apparatus 100 as shown in FIG. 2. Container 200 is charged with food and inserted into food blending and pressing apparatus 100 as shown in FIG. 3. FIG. 4 shows one embodiment where primary door 103 and secondary door 102 are closed and an external cup 300 next to food blending and pressing apparatus 100. During the food blending and pressing process, juice may be extracted out through spout 213 into external cup 300 for consumption (FIGS. 12A-12B). Spout 213 may be connected to a secondary outlet 212 which may be connected to outlet 204.

Figure 17:
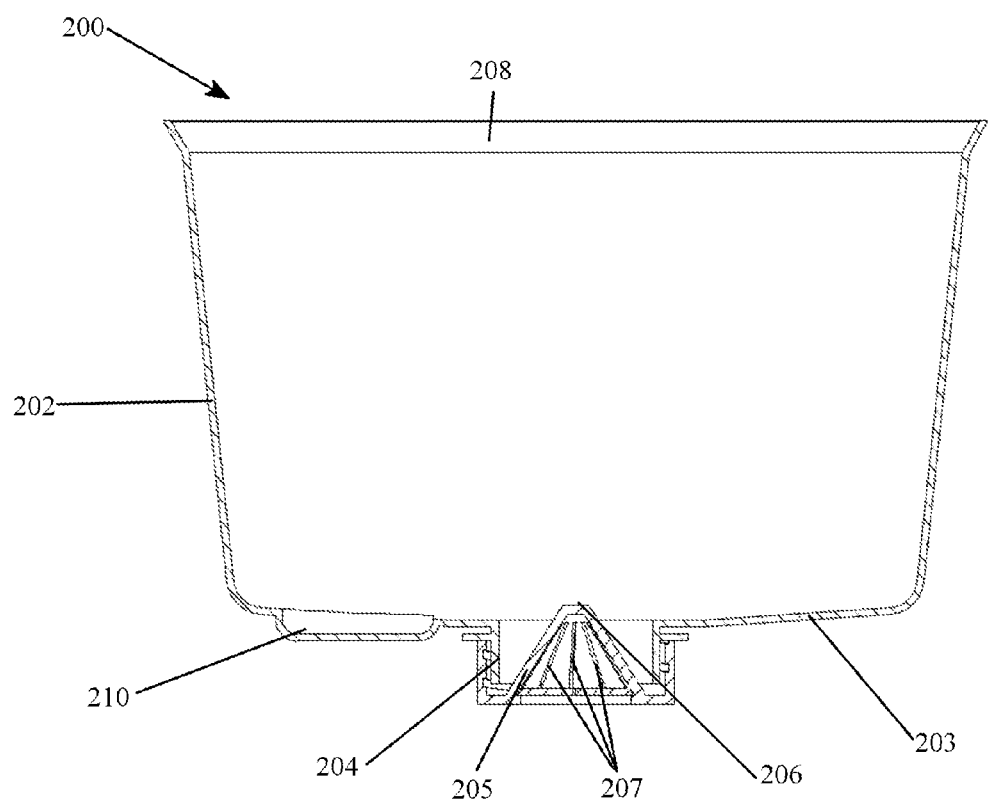
FIG. 17 is a perspective view of another embodiment of a container in accordance with the present invention, the sides are angled such that the containers are stackable.

Sides 202 of container 200 may be constructed in an inverted frustaconical shape such that the diameter of open top 201 is larger than the diameter of bottom 203 (FIG. 17). This allows container 200 to be stacked in another container 200 efficiently when empty. Container 200 may include a funnel 208 attached to open top 201 thereby correcting small misalignments when cover 111 is lowered into container 200. Container 200 may include one or more vertical pressure relief grooves 209 (FIG. 11) which allows pressure to escape container 200 until cover 111 is lowered below the bottom of pressure relief grooves 209. This allows cover 111 and blending tool 112 to be lowered into container 200 without forcing liquid through outlet 204. Also, a valve 211 may cover outlet 204 to prevent liquid from flowing out of container 200 until pressure is applied inside container 200, forcing liquid through outlet 204 (FIG. 15).

Figure 14:
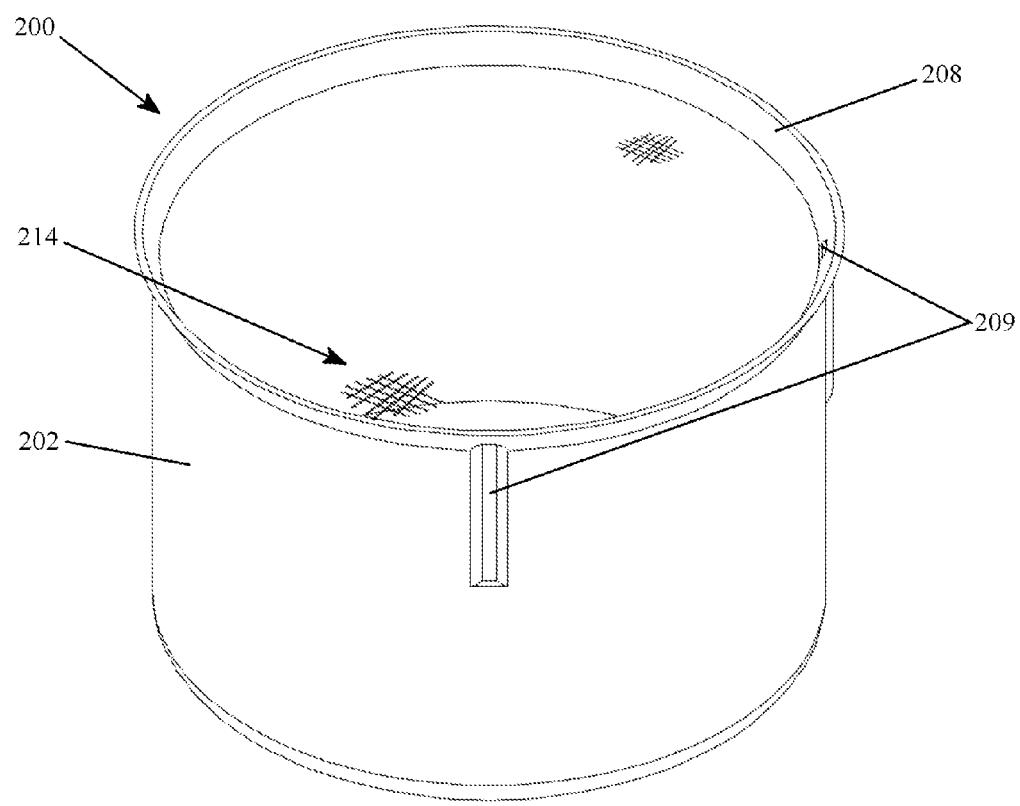
FIG. 14 is a perspective view of another embodiment of a container in accordance with the present invention, a plastic film is shown covering the open top.
Figure 15:
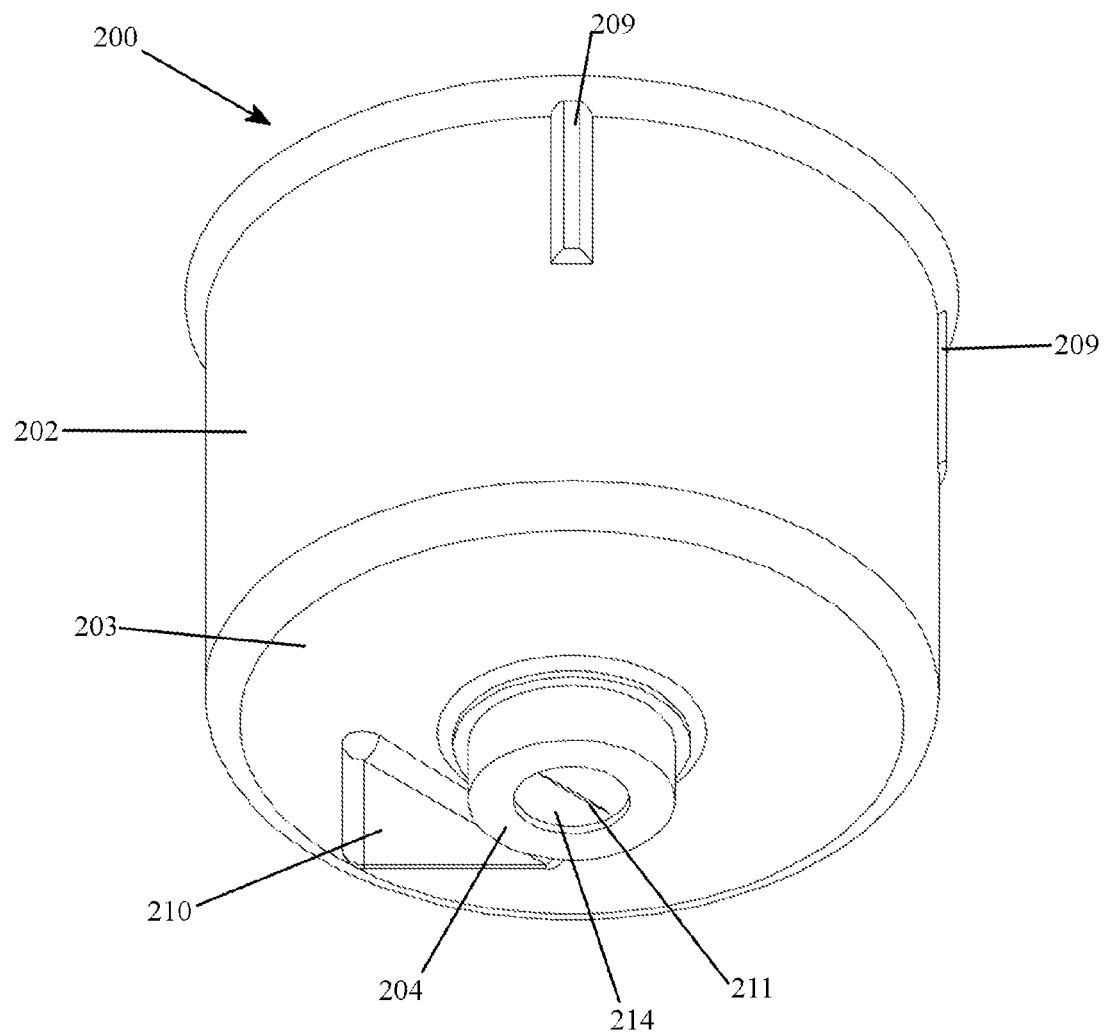
FIG. 15 is a perspective view of the bottom of the container shown in FIG. 14.

Bottom 203 may include an anti-rotational surface 210 in the shape of a downwardly protruding triangular-shaped vane (FIG. 15). Anti-rotational surface 210 is complementary to a concavely shaped anti-rotational surface 122 located in the bottom of container chamber 101 (FIG. 1) and such that when container 200 is inserted in container chamber 101, container 200 is unable to rotate. A plastic film 214 may be fixed to both open top 201 (FIG. 14) and outlet 204 (FIG. 15) of container 200 to prevent contamination prior to use.

Figure 16:
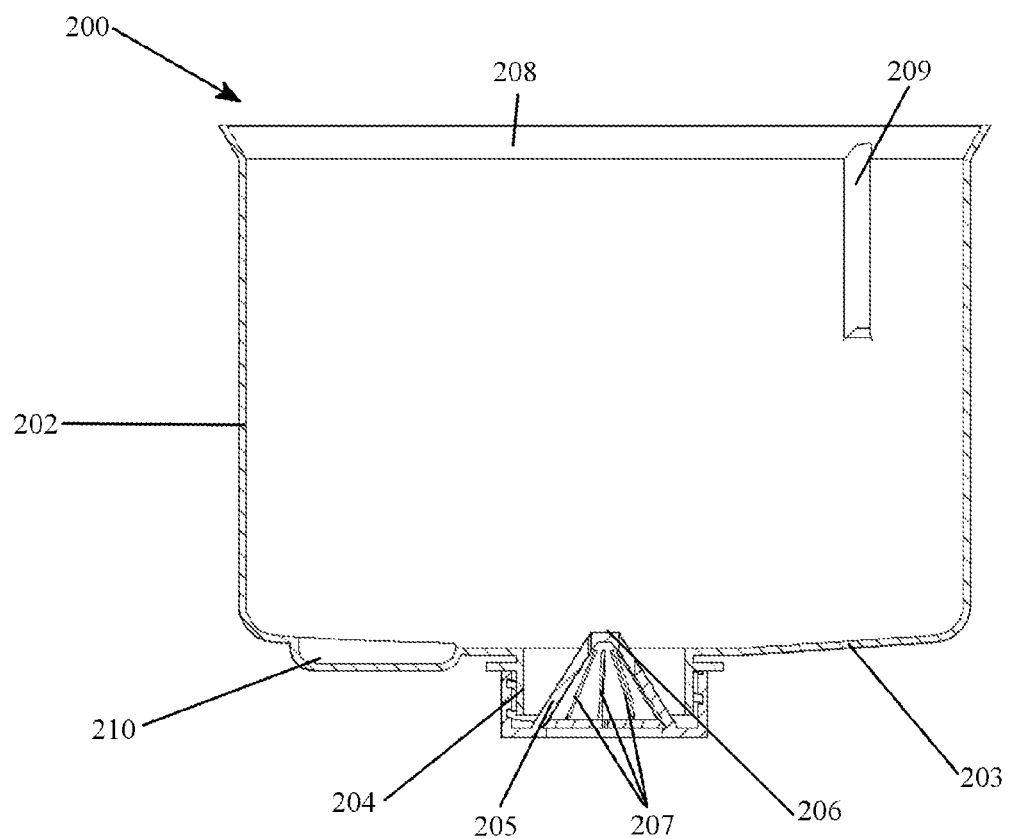
FIG. 16 is a cross sectional view of the container shown in FIG. 14.

FIGS. 14-16 generally illustrate an alternative configuration to container 200. No spout 213 or secondary outlet 212 are used. Outlet 204 may allow liquid to flow out of container 200 into an external cup (not shown) directly below container 200.

In the preferred embodiment, container 200 is filled with food and/or beverage and then placed in container chamber 101. A start button 106 is pressed by the user to initiate the blending and pressing process. The blending and pressing process begins by lowering shaft 110 along with attached blending tool 112 into container 200 while also lowering cover 111 into container 200 until cover 111 contacts container 200, thereby sealing open top 201. The food and/or beverage is blended by rotating shaft 110 and blending tool 112 using driving source 114. Shaft 110 and blending tool 112 are lowered and raised as necessary while rotating in order to properly blend the contents and then rotation is halted once a preferred consistency is met. Cover 111 is then lowered further into container 200, pressing food and/or beverage towards bottom 203 and forcing liquid through outlet 204. After the desired liquid has been extracted from the food and/or beverage, cover 111, shaft 110, and blending tool 112 are fully retracted and container 200 is removed from container chamber 101. Cover 111 and blending tool 112 may be removed from food blending and pressing apparatus 100 for cleaning.

Although the present invention has been described in considerable detail with reference to certain preferred versions thereof, other versions are possible. Therefore, the spirit and scope of the appended claims should not be limited to the description of the preferred versions contained therein. Any element in a claim that does not explicitly state "means for" performing a specified function, or "step for" performing a specified function, is not to be interpreted as a "means" or "step" clause as specified in 35 U.S.C. §112, ¶6. In particular, the use of "step of" in the claims is not intended to invoke the provisions of 35 U.S.C. §112, ¶6.

The reader's attention is directed to all papers and documents which are filed concurrently with his specification and which are open to public inspection with this specification, and the contents of all such papers and documents are incorporated herein by reference. All features disclosed in this specification (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalent or similar features.

What is claimed is:

1. A food blending and pressing apparatus comprising:
    a housing affording access to a container chamber when open, and sealing said container chamber when closed;
    a removably received container with, an upper opening, a bottom, and an outlet extending through the bottom;
    a cover hermetically sealing said upper opening of said container;
    a shaft extending through a center of said cover with a blending tool attached at the bottom of said shaft, wherein said shaft includes a connection for a driving source to rotate said shaft and said blending tool;
    a sanitary seal hermetically sealing said cover about said shaft;
    a primary elevator assembly attached to said shaft;
    a secondary elevator assembly attached to said cover; and
    wherein said driving source rotates said shaft and said blending tool during a blending process, said primary elevator assembly vertically reciprocates said shaft into said container for said blending tool to contact food or beverage or any combination thereof to form blended contents, said secondary elevator assembly vertically reciprocates said cover into said container for said cover to press blended contents towards the bottom of said container causing said blended contents to flow through said outlet.

2. The apparatus of claim 1 wherein said primary elevator assembly is driven by a spring-load lever.

3. The apparatus of claim 1 wherein said secondary elevator assembly is driven by an inflatable and deflatable airbag apparatus.

4. The apparatus of claim 1 wherein said connection on said shaft to said driving source is releasable and belt-driven.

5. The apparatus of claim 1 further comprising a releasable connector configured to connect said cover to said secondary elevator assembly.

6. The apparatus of claim 1 further comprising a releasable connector configured to connect said shaft to said primary elevator assembly.

7. The apparatus of claim 1 wherein said blending tool includes radially extended cutting blades.

8. The apparatus of claim 1 wherein an upper face of the container chamber bottom comprises an anti-rotational surface that is concavely shaped and complementary to a protruding anti-rotational surface on the container bottom.

9. The apparatus of claim 1 wherein said housing includes a primary door and latch configured to allow access to said blending tool and said cover.

10. The apparatus of claim 1 wherein said housing includes a secondary door and latch configured to allow access to said container chamber.

11. The apparatus of claim 1 further comprising a secondary outlet connected to the outlet.

* * * * *